Patented June 23, 1953

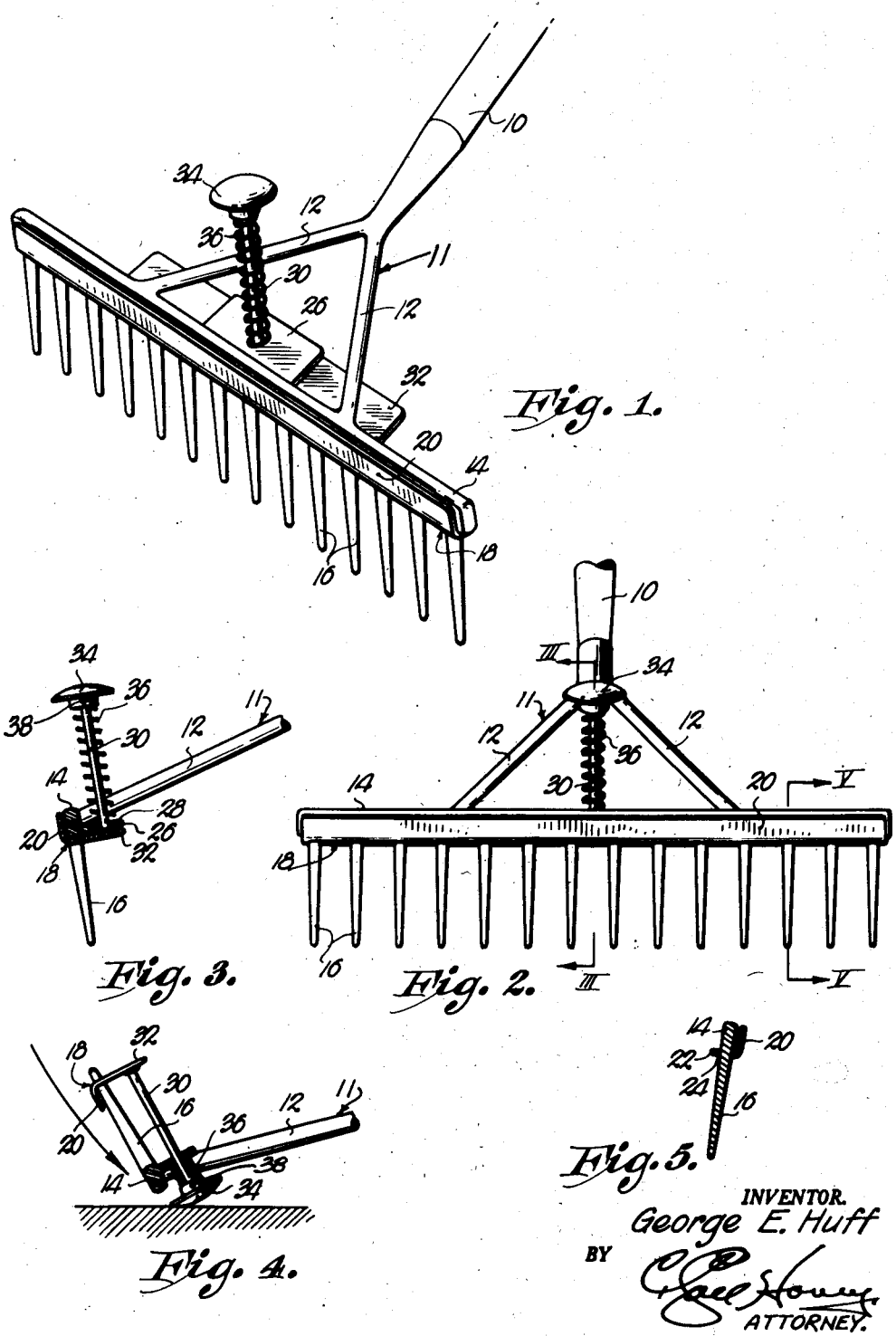

2,642,712

UNITED STATES PATENT OFFICE 2,642,712

SELF-CLEANING RAKE

George E. Huff, Miami, Okla.

Application October 16, 1950, Serial No. 190,395

1 Claim. (Cl. 56—400.08)

This invention relates to garden tools in the nature of a rake of the kind having a handle provided with a toothed bar at one end thereof, the primary object being to provide a trash cleaner for the tines or teeth of the rake capable of effectively removing all trash and other foreign articles tending to collect upon the tines through the simple expedient of imparting reciprocable movement to parts of the cleaner.

It is the most important object of the present invention to provide a garden rake having trash cleaning means therefor in the nature of a perforated plate shiftable along the lengths of the tines for sweeping the same clean of collected material as the plate is moved with respect to the rake teeth.

Another object of this invention is the provision of a trash cleaner for garden rakes including an elongated, perforated plate having an actuator spring-loaded to hold the plate at one end of its path of travel when the rake is in normal use, the actuator being so formed and disposed as to permit operation of the cleaner merely upon inverting the rake and applying force to the actuator, Other objects include refined details of construction, all of which will be made clear or become apparent as the following specification hereof progresses, reference being had to the accompanying drawing, wherein:

Figure 1 is a perspective view of a self-cleaning rake made pursuant to the present invention.

Fig. 2 is an end elevational view thereof.

Fig. 3 is a cross-sectional view taken on line III—III of Fig. 2.

Fig. 4 is a sectional view similar to Fig. 3 showing the rake in an inverted position; and Fig. 5 is a cross-sectional view taken on line V—V of Fig. 2 looking in the direction of the arrows.

The garden rake upon which the trash cleaner of the present invention is adapted to be mounted is for the most part of conventional character in that the same includes an elongated handle 10 provided with a T-shaped member 11, one leg of which consists of outwardly diverging frame pieces 12 interconnected by an elongated bar 14 which forms the other leg of the member 11.

Bar 14 is provided in the usual manner with a plurality of substantially parallel, elongated teeth or tines 16.

The trash cleaner per se includes an elongated element 18 substantially coextensive in length with the bar 14 and substantially L-shaped in cross-section as indicated in Fig. 5 of the drawing, presenting a pair of legs 20 and 22. The leg 32 of element 18 is provided with a plurality of openings or perforations 24 for receiving the tines 16 of bar 14 and when the element 18 is at one end of its path of travel next adjacent the bar 14, the leg 20 thereof overlaps the forwardmost face of bar 14.

The bar 14 is provided with a relatively small plate 26 on the innermost face thereof extending rearwardly toward the handle 10 that is perforated as at 28 for slidably receiving an actuator rod 30 that extends upwardly from a point of rigid connection with a plate-like projection 32 on the element 18 and extending toward the handle 10 from the leg 22 of element 18. The normally uppermost end of the plunger rod 30 is provided with a knob or head 34 and a spring 36 coiled about the rod 30 bears at one end thereof against the head 34 and at its opposite end against the plate 26. Accordingly, the element 18 is held biased at the upper end of its path of travel next adjacent the lowermost edge of bar 14.

The rake is normally placed in use in the conventional manner, the above described trash cleaning means being held entirely out of interference with such normal use by the spring 36. When however, a collection of foreign matter appears upon the tines 16 such as leaves, grass, wet dirt and the like, the same can be easily and quickly removed by forcing the element 18 downwardly toward the free ends of the tines 16. Such movement of the element 18 may be accomplished by actuating the rod 30 against the action of spring 36 forcing the same downwardly through the perforation 28 of plate 26. If desired, the operator may push upon the head 34 manually, but as illustrated in Fig. 4 of the drawing, it is necessary only to invert the normal position of the tines 16 and force the rake downwardly against the ground or any other surface which will in turn shift the element 18 toward the free ends of the tines 16. As soon as the rake is lifted from the position illustrated in Fig. 4 of the drawing, spring 36 will automatically return element 18 to the normally inoperative position and in engagement with the normally lowermost edge of bar 14.

It is seen that by virtue of the plurality of perforations 24 formed in the leg 22 of element 18, there being a perforation 24 for each tine 16 respectively, the tines 16 will be cleaned substantially free of all foreign matter each time that the element 18 is actuated. The edges of the leg 22 forming the perforations 24 will wipe the tines 16 clean and not only force trash that is collected between the tines therefrom but scrape the tines free of dirt and trash collection.

As is clear in Figs. 3 and 4, knob 34 has a setscrew 38 for releasably attaching the same to rod 30 so that upon removal of knob 34, the L-shaped element 18 may be dropped from place and removed from the rake.

The cleaner is simple, easy and inexpensive to manufacture, not likely to become damaged during use and fully capable of cleaning a garden rake substantially free from all foreign matter in a highly efficient manner.

Having thus described the invention what is claimed as new and desired to be secured by Letters Patent is:

A trash cleaner for a rake having a handle, and a T-shaped member having one leg thereof mounted on one end of the handle, the other leg of said member comprising an elongated bar having a series of teeth extending downwardly from the normally lowermost longitudinal edge thereof, said cleaner comprising a flat, normally horizontal plate integral with the bar and extending rearwardly from the normally rearmost face of the bar, an elongated, L-shaped element coextensive in length with the bar and having a normally horizontal leg and a normally vertical leg, there being a row of openings formed in said horizontal leg for receiving said teeth, the vertical leg of said element normally overlapping the normally forwardmost face of the bar, said horizontal leg of the element having an integral, rearwardly extending, plate-like, normally horizontal projection intermediate the ends thereof underlying the plate of said member, said horizontal leg being coextensive in width with the width of said lowermost edge of the bar, said vertical leg being coextensive in width with the width of said forwardmost face of the bar; an upstanding actuator rod fixed to the projection and extending through the plate of said member for sliding movement therein; a knob on the uppermost end of said rod; a spring coiled about the rod between the knob and the uppermost face of the plate of said member for yieldably holding the extension against the plate on the member and said horizontal leg of the element against said lowermost edge of the bar; and releasable means for attaching the knob to the rod.

GEORGE E. HUFF.

References Cited in the file of this patent

UNITED STATES PATENTS

| Number | Name | Date |
|---|---|---|
| 1,099,954 | Webster | June 16, 1914 |
| 1,128,239 | Ferguson | Feb. 9, 1915 |
| 1,264,750 | Bacho | Apr. 30, 1918 |
| 2,470,863 | Pringle | May 24, 1949 |